United States Patent Office 3,509,211
Patented Apr. 28, 1970

3,509,211
SULFAMIDES
Atso Ilvespaa, Neu-Allschwil, Max Wilhelm Allschwil, and Adrian Marxer, Muttenz, Switzerland, assignors to Ciba Corporation, New York, N.Y., a corporation of Delaware
No Drawing. Continuation-in-part of application Ser. No. 553,709, May 31, 1966, which is a continuation-in-part of application Ser. No. 324,178, Nov. 18, 1963. This application Jan. 16, 1968, Ser. No. 698,158.
Claims priority, application Switzerland, Nov. 20, 1962, 13,567/62; Oct. 2, 1963, 12,111/63
Int. Cl. C07c *143/72*
U.S. Cl. 260—556     15 Claims

ABSTRACT OF THE DISCLOSURE

New sulfamides of the formula

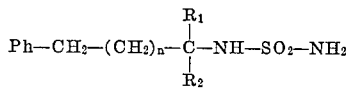

wherein Ph stands for substituted or unsubstituted phenyl, $R_1$ for lower alkyl, $R_2$ for lower alkyl or hydrogen and $n$ for 0 or 1, e.g. the N[1-methyl-2-(m-chlorophenyl)-ethyl]sulfamide.

Use: CNS inhibiting agents, especially sedative and narcotic agents.

CROSS REFERENCES TO OTHER APPLICATIONS

This is a continuation-in-part of our application Ser. No. 553,709, filed May 31, 1966, now abandoned, which in turn is a continuation-in-part of our application Ser. No. 324,178, filed Nov. 18, 1963, now abandoned.

SUMMARY OF THE DISCLOSURE

The present application relates to new sulfamides. More especially it concerns compounds of the formula

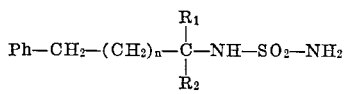

in which Ph stands for a phenyl radical which is unsubstituted or which is substituted by one, two or more substituents selected from the group consisting of halogen atoms, trifluoromethyl groups and lower alkyl radicals, $R_1$ for a lower alkyl radical, $R_2$ for a lower alkyl radical or preferably for a hydrogen atom and $n$ is 0 or 1.

A lower alkyl radical is above all a methyl, ethyl, propyl, isopropyl, butyl or isobutyl group and a halogen atom is, for example, a fluorine, chlorine or bromine atom.

The new compounds possess valuable pharmacological properties. Inter alia, they display in the mouse, rat, rabbit, cat and dog inhibiting effects on the central nervous system by acting as sedatives or narcotics, as can be shown e.g. in the mouse in the rotating rod test. In addition, they possess anticonvulsive properties. They are therefore, useful for example as sedatives, narcotics and as anticonvulsants. They are also suitable for use as intermediates in the manufacture of medicaments.

Particularly valuable are those compounds of the formula (II)
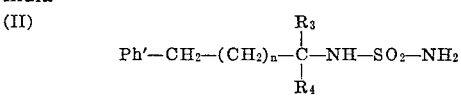

in which Ph' represents an unsubstituted phenyl radical, a trifluoromethylphenyl radical or a halophenyl radical, primarily the meta-chlorophenyl group or the meta-trifluoromethylphenyl group; $R_3$ represents a methyl group and $R_4$ a hydrogen atom or a methyl group, and $n=0$ or 1. There may be mentioned more especially N-(1-methyl-2-phenylethyl)-sulfamide, N[1 - methyl - 2 - (m - chlorophenyl)-ethyl]-sulfamide and N-[1-methyl-2-(m-trifluoromethylphenyl)-ethyl]-sulfamide, which e.g. in mice, on oral administration in dosages from 20 to 100 mg./kg., show a significant sedative action, and the levorotatory N-[1-methyl-2-(m-chlorophenyl)-ethyl] - sulfamide which e.g. in mice on oral administration in dosages from 30 to 50 mg./kg. shows a significant sedative action.

The new compounds are manufactured in known manner. Thus, for example, they are obtained, when an amine of the formula

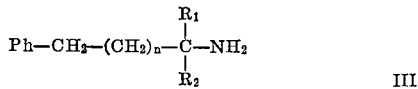

in which Ph, $R_1$, $R_2$ and $n$ have the meanings given above is reacted with a compound of the formula $Y-NH_2$ in which Y stands for a free or functionally converted (more especially amidated or halogenated, for example chlorinated) sulfo group.

According to a particularly advantages modification of the process, an amine of the Formula III is reacted with sulfamide.

The aforementioned reaction may be performed in the presence or absence of solvents or diluents, for example in water or organic solvents, for example alcohols such as ethanol or isopropanol, in ethers such as dioxane or tetrahydrofuran, in formamides such as dimethylformamide, or in hydrocarbons such as hexane, cyclohexane, benzene or toluene, or of condensing agents, for example tertiary nitrogen bases such as pyridine or triethylamine, at room temperature or with heating under atmospheric, reduced or superatmospheric pressure.

The new sulfamides may also be obtained, when in a compound of the formula

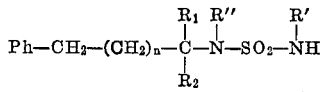

in which Ph, $R_1$, $R_2$ and $n$ have the above meanings and one of the symbols R' and R" (especially R') represents an acyl radical of a lower aliphatic or aromatic carboxylic acid and the other (especially R") represents a hydrogen atom, the aforesaid acyl radical is split off by hydrolysis.

An acyl radical of a lower aliphatic or aromatic carboxylic acid is above all a lower alkanoyl radical, such as a formyl or acetyl radical or a benzoyl radical.

The hydrolysis is performed in the conventional manner, for example in the presence of a dilute aqueous acid, such as hydrochloric acid or sulfuric acid, if desired with heating.

Depending on the starting materials and reaction conditions used the new compounds are obtained in the free form or in the form of their salts also included in the invention. The free compounds may be converted in conventional manner into salts, for example by reaction with a strong base, particularly with such as yield therapeutically useful salts, for example alkali metals or alkaline earth metals or with hydroxides thereof. As alkali or alkaline earth metal salts there come into consideration more particularly sodium, potassium, magnesium or calcium salts. A resulting salt can be converted into the free compound, for example by reaction with an acid.

These or other salts of the new compounds may be used for purifying the resulting free compounds by converting the free compounds into a salt, separating the latter and liberating the free compounds again from the salts. In view of the close relationship between the new compounds in the free form and in the form of a salt thereof, whenever a free compound is referred to in this context, a corresponding salt is also intended, provided such is possible or appropriate under the circumstances.

The new compounds may also be in the form of racemates which may be resolved into the optical antipodes in the conventional manner.

The invention includes also any variant of the present process in which an intermediate obtainable at any stage of the process is used as starting material and any remaining step or steps is/are carried out or the process is discontinued at any stage thereof, or in which a starting material is formed under the reaction conditions or in which the reactants are used in the form of their salts.

For the reactions of the invention such starting materials are primarily used as yield the above-mentioned preferred compounds.

The starting materials are known or, insofar as they are new, they may be prepared by known methods, for example those described in the following examples.

The new sulfamides may be used, for example, in the form of pharmaceutical preparations containing said compounds in conjunction or admixture with organic or inorganic solid or liquid pharmaceutical excipients suitable for enteral (for example oral) or parenteral administration. Suitable excipients are substances that do not react with the new compounds, for example water, gelatine, lactose, starches, magnesium stearate, talcum, vegetable oils, benzyl alcohols, gums, polyalkyleneglycols, cholesterol or other known medicinal excipients. The pharmaceutical preparations may be, for example, tablets, pills or capsules, or in liquid form solutions, suspensions or emulsions. These pharmaceutical preparations may be sterilised and/or they may contain assistants, such as preserving, stabilising, wetting or emulsifying agents, salts for regulating the osmotic pressure, or buffers. They may also contain further therapeutically valuable substances. The pharmaceutical compositions for oral use advantageously contain 100 to 450, especially 200 to 300 mg. of the active ingredient per dosage unit.

The new compounds may also be used in the form of a feed stuff or an additive to an animal feedstuff, the customary fillers or diluents or feedstuffs being used.

The following examples illustrate the invention.

EXAMPLE 1

A mixture of 20.3 g. of 1-phenyl-2-aminopropane and 28.8 g. of sulfamide is stirred in an oil bath for 5 hours at 110° C., then allowed to cool and 50 cc. of 2 N-hydrochloric acid are added. The initially oily reaction product is vigorously stirred for about 30 minutes, whereupon it crystallises; it is suctioned off, washed with water, dried and recrystallised from benzene, to yield N-(1-methyl-2-phenylethyl)-sulfamide of the formula

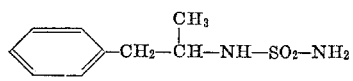

melting at 79 to 80° C.

EXAMPLE 2

A mixture of 13.7 g. of 1-phenyl-3-aminobutane and 8.9 g. of sulfamide is heated and stirred for 5 hours at 90° C., then allowed to cool, mixed with 50 cc. of 2 N-hydrochloric acid, and the reaction mixture is further stirred overnight. The residual oil is taken up in ether and the solution is chromatographed on 30 times its own quantity of alumina (activity I) and eluted with benzene+ethyl acetate mixtures having an increasing content of ethyl acetate, to yield N-(1-methyl-3-phenylpropyl)-sulfamide of the formula

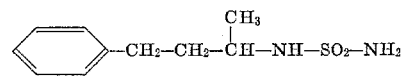

melting at 70 to 72° C.

EXAMPLE 3

A mixture of 24.2 g. of 1-phenyl-2-aminobutane and 15.6 g. of sulfamide is stirred for 5 hours at 90° C. then allowed to cool, mixed with 100 cc. of 2 N-hydrochloric acid, and the resulting mixture is vigorously stirred on for 2 hours. The oily product is taken up in chloroform, and the solution is dried over magnesium sulfate and evaporated. The residue is recrystallised first from benzene+petroleum ether 1:1 and then from water; it yields N-(1-ethyl-2-phenylethyl)-sulfamide of the formula

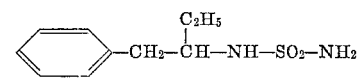

melting at 86 to 87° C.

EXAMPLE 4

A mixture of 60.0 g. of 1-phenyl-2-methyl-2-aminopropane and 38.7g. of sulfamide is stirred for 48 hours at an oilbath temperature of 90° C., allowed to cool, mixed with 200 cc. of 2 N-hydrochloric acid, vigorously stirred for 1 hour at room temperature, the precipitated crystalline disubstituted sulfamide (melting at 103 to 105° C.) is filtered off, and the filtrate is diluted with 1 liter of water. The oil separating out after this dilution is taken up in chloroform, and the solution is dried and evaporated. The residue is taken up in benzene, chromatographed on 30 times its own quantity of alumina (activity I) and eluted with mixtures of benzene and ethanol having a rising content of ethanol (starting with 80:1), to yield N-(1:1-dimethyl-2-phenylethyl)-sulfamide of the formula

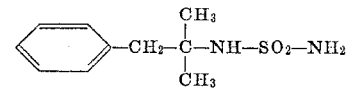

melting at 56 to 58° C.

EXAMPLE 5

A mixture of 37.5 g. of 1-phenyl-2-aminopentane and 22.1 g. of sulfamide is stirred for 5 hours at 100° C., cooled, and then mixed with 100 cc. of 2 N-hydrochloric acid. The oily reaction product is taken up in chloroform and chromatographed as in Example 4, to yield N-(1-propyl-2-phenylethyl)-sulfamide of the formula

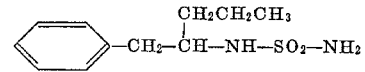

melting at 79 to 80° C. (from cyclohexane).

EXAMPLE 6

When 38.5 g. of 1-phenyl-2-amino-3-methylbutane are reacted with 22.6 g. of sulfamide at 110° C. as described in Example 5 and the reaction mixture is processed in identical manner, there results N-(1-isopropyl-2-phenyl-ethyl)-sulfamide of the formula

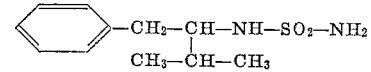

melting at 99 to 100° C. (from methylcyclohexane).

EXAMPLE 7

A mixture of 17.0 g. of 1 - (para-chlorophenyl)-2-aminopropane and 9.6 g. of sulfamide is stirred and heated for 5 hours at 90° C., allowed to cool, mixed with 50 cc. of 2 N-hydrochloric acid and extracted with chloroform. The resulting solution is then chromatographed as described in Example 4, to yield N-[1-methyl-2-(para-chlorophenyl) - ethyl]-sulfamide of the formula

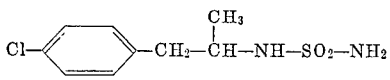

melting at 83 to 85° C. (from benzene).

EXAMPLE 8

A mixture of 22.8 g. of 1-(meta - chlorophenyl)-2-aminopropane and 13.0 g. of sulfamide is stirred for 5 hours at an oilbath temperature of 90° C., then allowed to cool, 100 cc. of 2 N-hydrochloric acid are stirred in, the oil which settles out is extracted with chloroform and the extract is evaporated. The viscid oil is dissolved with heating in 25 cc. of water, and the solution is left to itself for a fortnight at room temperature, to yield crystalline N-[1 - methyl - 2-(m-chlorophenyl)-ethyl]-sulfamide of the formula

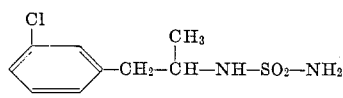

which, after having been filtered off, washed with water and dried, melts at 68 to 70° C. From the evaporated mother liquor further amounts of this compound can be isolated and then purified by chromatography as described in Example 4.

EXAMPLE 9

When a mixture of 16.2 g. of 1-(para-chloro-phenyl)-2-aminobutane and 8.5 g. of sulfamide is stirred while being heated for 5 hours at 90° C. and then for 4 hours at 130° C., and the resulting reaction mixture is worked up as described in Example 7, N-[1-ethyl-2-(p-chlorophenyl)-ethyl]-sulfamide of the formula

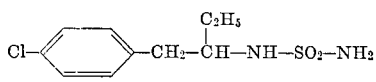

melting at 106 to 108° C. is obtained.

EXAMPLE 10

The reaction described in Example 9, performed with 20.4 g. of 1-(2':4'-dichlorophenyl)-2-aminopropane and 9.6 g. of sulfamide, yields N-[1-methyl-2-(2:4-dichlorophenyl)-ethyl]-sulfamide of the formula

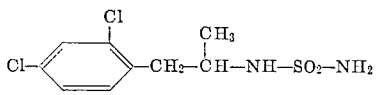

melting at 99 to 101° C. (from benzene).

The new starting materials used in Examples 8 and 9 can be prepared, for example, as follows:

A solution of 0.5 g. of 1-(meta-chlorophenyl)-2-nitro-1 - propene in 300 cc. of absolute tetrahydrofuran is stirred within 15 minutes dropwise into a suspension of 50 g. of lithium-aliminium hydride in 2000 cc. of absolute tetrahydrofuran, and the reaction mixture is then refluxed at the boil for 2 hours. While cooling the batch with ice, 50 cc. of water in 250 cc. of tetrahydrofuran, 200 cc. of 2 N-sodium hydroxide solution and 100 cc. of water are successively dropped in, the precipitate formed is suctioned off, washed with tetrahydrofuran, and the filtrate is evaporated to dryness. The residue is taken up in 200 cc. of chloroform and the solution is extracted with 200 cc. of 2 N-hydrochloric acid. The extract is alkalinised with 60 cc. of 10 N-sodium hydroxide solution, the precipitated 1-(meta-chlorophenyl)-2 - aminopropane is taken up in chloroform, the solution is dried and evaporated and the residue is distilled under diminished pressure. The product boils at 120 to 122° C. under 15 mm. Hg pressure.

In an analogous manner 1-(para-chlorophenyl)-2-nitro-1-butene furnishes 1-(para-chlorophenyl)-2-amino-butane boiling at 126° C. under 12 mm. Hg pressure.

EXAMPLE 11

40.0 g. of 1-(para-tolyl)-2-aminopropane and 51.6 g. of sulfamide are stirred for 5 hours at 100° C.; when the reaction mixture has cooled somewhat, 300 cc. of 2 N-hydrochloric acid are added. The oily reaction product is taken up in methylene chloride and chromatographed as described in Example 4, to yield N-[1-methyl-2-(para-tolyl)-ethyl]sulfamide of the formula

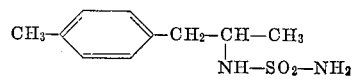

melting at 59–60° C. (from di-isopropyl ether).

The 1-(para-tolyl) - 2-aminopropane used as starting material is prepared as follows:

A solution of 90.0 g. of 1-nitro - 1 - methyl-2-(para-tolyl)-ethylene in 200 cc. of absolute tetrahydrofuran is added dropwise in the course of 1 hour to a suspension of 50 g. of lithium aluminium hydride in 1250 cc. of absolute tetrahydrofuran, the reaction mixture then boiled under reflux for 2 hours and worked up as described in Example 10. The resulting 1-para-tolyl-2-amino-propane boils at 104–106° C. under 12 mm. pressure of mercury.

EXAMPLE 12

From 18.0 g. of 1-(meta - trifluoromethyl-phenyl)-2-aminopropane and 16.1 g. of sulfamide there is obtained in an analogous manner to that described in Example 11 N-[1 - methyl - 2 - (meta-trifluoromethylphenyl)-ethyl]-sulfamide of the formula

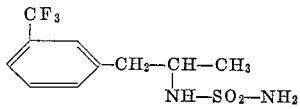

melting at 79–80° C. (from benzene cyclohexane).

EXAMPLE 13

Tablets containing 200 mg. of N-(1-methyl-2-phenylethyl)-sulfamide can be prepared, for example with the following ingredients:

|  | Mg. |
|---|---|
| N-(1-methyl-2-phenylethyl)-sulfamide | 200 |
| Tricalacium phosphate | 40 |
| Colloidal silicic acid with hydrolysed starch | 20 |
| Wheat starch | 59 |
| Arrowroot | 20 |
| Magnesium stearate | 1 |
| Talc | 10 |
|  | 350 |

Method

N-(1-methyl-2-phenylethyl)-sulfamide is homogeneously mixed with tricalcium phosphate, colloidal silicic acid with hydrolysed starch and wheat starch. The mixture is moistened with water and kneaded until a slightly plastic mass is formed.

The mass is then passed through a sieve having a 4–5 mm. mesh and dried at 40–50° C. The dried granulate is passed through a sieve having an 0.8–1.4 mm. mesh, the remaining disintegrating agents and lubricants are added and after the whole has been homogenized, it is compressed in the conventional manner into tablets having 9 mm. diameter and weighing 350 mg.

EXAMPLE 14

Tablets, each containing 300 mg. of N-[1-methyl-2-(meta-chlorophenyl)-ethyl]-sulfamide, can be prepared, for example, from the following ingredients:

| | per tablet, mg. |
|---|---|
| N-[1-methyl-2-(meta-chlorophenyl)-ethyl]-sulfamide | 300 |
| Tricalcium phosphate | 45 |
| Colloidal silicic acid | 22 |
| Wheat starch | 66 |
| Talc | 15 |
| Magnesium stearate | 2 |
| | 450 |

Method

N-[1-methyl-2-(meta-chlorophenyl)-ethyl]-sulfamide is homogeneously mixed with part of the wheat starch and the mixture forced through a sieve. Another portion of the wheat starch is pasted in a water bath with five times its quantity of water and the powder mixture kneaded with the resulting paste and some water until a slightly plastic mass is obtained. The moist mass is forced through a 3–5 mm. mesh sieve, dried at 40–50° C., and the dry granulate passed through a 1 mm. mesh sieve. The remainder of the wheat starch, the talc and the magnesium stearate are then admixed and the resulting homogeneous mixture compressed into tablets each weighting 400 mg.

EXAMPLE 15

29.0 g. of meta-fluoro-α-methylphenethylamine and 38.4 g. of sulfamide are stirred in an oil bath at 100° C. for 5 hours and, after cooling, treated with 200 ml. of 2 N-hydrochloric acid. After about 2 hours' vigorous stirring the oily reaction product is dissolved in methylene chloride. The oily product obtained on drying and evaporation of the methylene chloride solution is chromatographed over the 40-fold quantity of alumina (activity I). Elution with a 75:1-mixture of benzene and absolute ethanol yields N-[1-methyl-2-(meta-fluorophenyl)-ethyl]-sulfamide of the formula

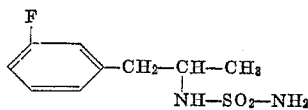

melting at 59–60° C.

EXAMPLE 16

42.7 g. of ortho-chloro-α,α-dimethylphenethylamine and 47.0 g. of sulfamide are stirred in an oil bath at 90° C. for 120 hours. The still hot reaction mixture is thoroughly stirred while being treated with 350 ml. of 2 N-hydrochloric acid, and the reaction product which precipitates is dissolved in methylene chloride. The methylene chloride solution is dried and evaporated, and the residue chromatographed over the 30-fold quantity of alumina (activity I). The product is eluted with mixtures of benzene and absolute ethanol with increasing proportions of ethanol (initially 150:1). There is obtained in this manner N-[1,1-dimethyl-2-(orthochlorophenyl)-ethyl]-sulfamide of the formula

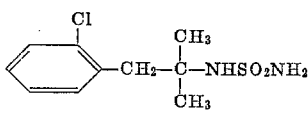

melting at 90.5–91° C. (from cyclohexane).

EXAMPLE 17

A mixture of 20.0 g. of N-acetyl-N'-[1-methyl-2-(meta-trifluoromethylphenyl) - ethyl] - sulfamide, 150 ml. of ethanol and 15 ml. of concentrated hydrochloric acid are refluxed for 1 hour, and the solution then evaporated to dryness. The residue is dissolved in 300 ml. of methylene chloride, and the methylene chloride solution extracted by agitation with 3× 50 ml. of water, dried with anhydrous sodium sulfate, and evaporated. The residue is recrystallized first with 75 ml. of toluene and then with 50 ml. of diisopropylether. There is obtained in this manner pure N-[1-methyl-2-(meta-trifluoromethylphenyl)-ethyl]-sulfamide melting at 80° C. It is identical with product obtained in Example 12.

The N-acetyl - N' - [1-methyl-2-(meta-trifluoromethylphenyl)-ethyl]-sulfamide used as starting material can be prepared as follows:

A solution of 38.2 g. of acetylaminosulfonyl chloride in 120 ml. of absolute dioxan is added dropwise in the course of 30 minutes, while stirring, at 20–25° C. to a solution of 49.2 g. of 1-(meta-trifluoromethyl-phenyl)-2-aminopropane and 60 ml. of absolute triethylamine in 250 ml. of absolute dioxan. The batch is then stirred for another 3 hours at 80° C. The triethylamine hydrochloride which precipitates is filtered off with suction and the mother liquor evaporated. The residue is dissolved in 125 ml. of 2 N aqueous ammonia solution, diluted with 125 ml. of water, and the resulting milky solution clarified by means of diatomaceous earth and active carbon. The solution is then treated with 65 ml. of 6.5 N-hydrochloric acid, and the product which precipitates is dissolved in 500 ml. of methylene chloride. The methylene chloride solution is evaporated and the residue is first triturated with diisopropyl ether, filtered with suction, thoroughly washed with diisopropyl ether, and then recrystallized from 100 ml. of toluene and 200 ml. of diisopropyl ether. The N-acetyl-N'-[1-methyl-2-(meta-trifluoromethylphenyl)-ethyl]-sulfamide so obtained melts at 125–127° C.

EXAMPLE 18

31.1 g. of N'-acetyl-N-[1,1-dimethyl-2-(meta-chlorophenyl)-ethyl]-sulfamide and 30 ml. of concentrated hydrochloric acid are dissolved in 300 ml. of ethanol. The batch is then refluxed for 1 hour and evaporated to dryness, and the residue extracted by agitation with 400 ml. of methylene chloride and 100 ml. of water. The methylene chloride solution is extracted with 2× 100 ml. of water, dried with anhydrous sodium sulfate, and evaporated. The residue is recrystallized from 25 ml. of toluene to obtain N-[1,1-dimethyl-2-(meta-chlorophenyl)-ethyl]-sulfamide of the formula

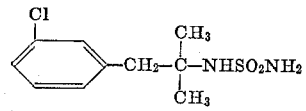

which melts at 74–75° C.

N'-acetyl-N-[1,1-dimethyl - 2 - (meta - chlorophenyl)-ethyl]-sulfamide can be prepared as follows:

A solution of 33.6 g. of N-acetylaminosulfonyl chloride in 100 ml. of absolute dioxan is added dropwise in the course of 20 minutes to a solution of 39.1 g. of meta-chloro-α,α-dimethylphenethylamine and 27.6 g. of N-ethyl-diisopropylamine in 400 ml. of absolute dioxan. The batch is then stirred overnight at room temperature, evaporated to dryness, and the residue extracted with 500 ml. of methylene chloride and 250 ml. of water. The methylene chloride solution is then extracted successively with 250 ml. of 2 N-hydrochloric acid and 2× 200 ml. of water, dried with anhydrous sodium sulfate, and evaporated. The residue is recrystallized from 200 ml. of toluene. The resulting N'-acetyl-N-[1,1-dimethyl-2-(meta-chlorophenyl) - ethyl] - sulfamide melts at 142–143° C.

Meta-chloro-α,α-dimethyl-phenethylamine can be prepared for example by the Rifter reaction from meta-chlorobenzyl-dimethylcarbinol. It is a water-clear oil boiling at 60–70° C. under a pressure of 0.15 mm. of Hg.

EXAMPLE 19

27.0 g. of (+)-α-methylphenethylamine and 24.0 g. of sulfamide are stirred at 80° C. in an oil bath for 23 hours. The still hot reaction mixture is treated with 75 ml. of 2 N-hydrochloric acid while stirring vigorously. The precipitated oil is dissolved in methylene chloride. After drying and evaporation of the methylene chloride solution, a white, crystalline substance of melting point 88–90° C. remains behind. Recrystallization from 60 ml. of benzene yields (+)-N-[1-methyl-2-phenylethyl]-sulfamide of the formula

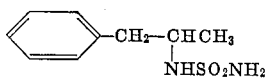

melting at 91–92° C. $[\alpha]_D^{20} = +7° \pm 0.5°$ (2% in methanol).

EXAMPLE 20

36.5 g. of (−)-meta-chloro-α-methylphenethylamine are added dropwise in the course of 1 hour at an oil bath temperature of about 125° C. to a melt of 41.3 g. of sulfamide. The batch is then stirred for another hour at an oil bath temperature of about 125° C. During the reaction, a weak current of nitrogen gas is passed through the reaction vessel. After that, the batch is then allowed to cool somewhat, and is treated with 200 ml. of 2 N-hydrochloric acid, then stirred vigorously for 30 minutes. It is then extracted with 3× 125 ml. of methylene chloride. The methylene chloride solutions are combined, dried, evaporated, and the residue, while still warm, is recrystallized from 150 ml. of diisopropylether. The resulting product, which melts at 90–91° C. is recrystallized once more from 65 ml. of toluene and (−)-N-[1-methyl-2-(meta-chlorophenyl)-ethyl]-sulfamide obtained which corresponds to the formula

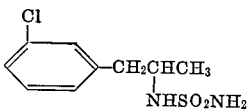

and melts at 90.5–91.5° C. $[\alpha]_D^{20} = -3 \pm 1°$ (1% in methanol).

The (−)-meta-chloro-α-methylphenethylamine used as starting material can be prepared as follows:

68.0 g. of racemic meta-chloro-α-methylphenethylamine are dissolved in 500 ml. of methanol. To this solution are added dropwise in the course of about 30 minutes at an internal temperature of 20–30° C., with stirring, 73.3 g. of dibenzoyl-D-tartaric acid, dissolved in 500 ml. of methanol. The batch is stirred for another hour at room temperature. The salt which precipitates is filtered off with suction, washed with methanol and dried. It melts at 206–207° C. with decomposition. The base is liberated by extracting the resulting salt with 400 ml. of 2 N-sodium hydroxide solution and 200 ml. of methylene chloride. The aqueous layer is then extracted with 2× 75 ml. of methylene chloride. The methylene chloride solutions are combined, dried, evaporated, and the residue distilled over a short Vigreux column. There is obtained (−)-meta-chloro-α-methylphenethylamine boiling at 118° C. under a pressure of 13 mm. Hg $[\alpha]_D^{20} = -17° \pm 0.5°$ (2% in methanol).

Working up of the methanol mother liquor, by way of the salt, with dibenzoyl-L-tartaric acid yields (+)-meta-chloro-α-methylphenethylamine boiling at 110–112° C. under a pressure of 11 mm. of Hg $[\alpha]_D^{20} = +18° \pm 0.5°$ (2% in methanol).

EXAMPLE 21

26.9 g. of (+)-meta-chloro-α-methylphenethylamine are added dropwise in the course of 1 hour at an oil bath temperature of about 125° C. to a melt of 30.4 g. of sulfamide. The batch is stirred for another hour at an oil bath temperature of about 125° C. During the reaction, a weak current of nitrogen gas is passed through the reaction vessel. After that, the batch is allowed to cool somewhat, then treated with 150 ml. of 2 N-hydrochloric acid, and stirred vigorously for 30 minutes. It is then extracted 3 times with methylene chloride. The methylene chloride solutions are combined and evaporated, and the residue, while still warm, is recrystallized from 100 ml. of diisopropyl ether. Recrystallization from 40 ml. of toluene yields (+)-N-[1-methyl-2-(meta-chlorophenyl)-ethyl]-sulfamide of the formula

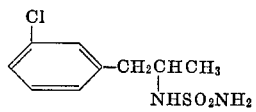

melting at 89–90° C. $[\alpha]_D^{20} = +4° \pm 0.5°$ (2% in methanol).

What is claimed is:

1. A compound of the formula

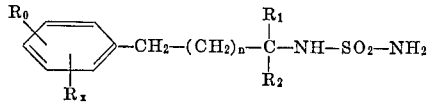

in which $R_0$ and $R_x$ each is a member selected from the group consisting of hydrogen, chlorine, bromine, fluorine, trifluoromethyl and lower alkyl, $R_1$ is lower alkyl, $R_2$ is a member selected from the group consisting of hydrogen and lower alkyl and $n$ is an integer from 0 to 1, in the free form or in the form of an alkali or alkaline earth metal salt thereof.

2. A compound as claimed in claim 1, wherein $R_0$ is a member selected from the group consisting of hydrogen, chlorine and trifluoromethyl, $R_1$ is methyl, $R_2$ is a member selected from the group consisting of methyl and hydrogen and $n$ for 0.

3. The compound as claimed in claim 1, which compound is the N-(1-methyl-2-phenylethyl)-sulfamide.

4. The compound as claimed in claim 1, which compound is the N-[1-methyl-2-(m-chlorophenyl)-ethyl]-sulfamide.

5. The compound as claimed in claim 1, which compound is the N-(1-methyl-3-phenylpropyl)-sulfamide.

6. The compound as claimed in claim 1, which compound is the N-(1-ethyl-2-phenylethyl)-sulfamide.

7. The compound as claimed in claim 1, which compound is the N-(1:1-dimethyl-2-phenylethyl)-sulfamide.

8. The compound as claimed in claim 1, which compound is the N-(1-propyl-2-phenylethyl)-sulfamide.

9. The compound as claimed in claim 1, which compound is the N-(1-isopropyl-2-phenylethyl)-sulfamide.

10. The compound as claimed in claim 1, which compound is the N-[1-ethyl-2-(para-chlorophenyl)-ethyl]-sulfamide.

11. The compound as claimed in claim 1, which compound is the N-[1-ethyl-2-(para-chlorophenyl)-ethyl]-sulfamide.

12. The compound as claimed in claim 1, which compound is the N-[1-methyl-2-(ortho,para-dichlorophenyl)-ethyl]-sulfamide.

13. The compound as claimed in claim 1, which compound is the N-[1-methyl-2-(meta-trifluoromethylphenyl)-ethyl]-sulfamide.

14. The compound as claimed in claim 1, which compound is the N-[1-methyl-2-(meta-fluorophenyl)-ethyl]-sulfamide.

15. The compound as claimed in claim 1, which compound is the (—)-N-[1-methyl-2-(meta-chlorophenyl)-ethyl]-sulfamide.

References Cited

UNITED STATES PATENTS 3,351,584   11/1967   Houlihan _____ 260—556

HENRY R. JILES, Primary Examiner

H. I. MOATZ, Assistant Examiner

U.S. Cl. X.R.

424—321

PO-1050
(5/69)

UNITED STATES PATENT OFFICE
CERTIFICATE OF CORRECTION

Patent No. 3,509,211   Dated April 28, 1970

Inventor(s) Atso Ilvespaa et al

It is certified that error appears in the above-identified patent and that said Letters Patent are hereby corrected as shown below:

Column 10, line 62, "[1-ethyl" should read --- [1-methyl ---.

Signed and sealed this 18th day of May 1971.

(SEAL)
Attest:

EDWARD M. FLETCHER, JR.
Attesting Officer

WILLIAM E. SCHUYLER, JR.
Commissioner of Patents